United States Patent
Paladini et al.

(10) Patent No.: US 7,469,073 B2
(45) Date of Patent: Dec. 23, 2008

(54) IMAGE-BASED METHOD FOR DETECTION AND REMOVAL OF SMALL FRAGMENTS IN SEGMENTED THREE-DIMENSIONAL VOLUMES

(75) Inventors: Gianluca Paladini, Skillman, NJ (US); Daphne Yu, Yardley, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 863 days.

(21) Appl. No.: 11/110,077

(22) Filed: Apr. 20, 2005

(65) Prior Publication Data

US 2005/0260658 A1 Nov. 24, 2005

Related U.S. Application Data

(60) Provisional application No. 60/573,961, filed on May 24, 2004.

(51) Int. Cl.
*G06K 9/40* (2006.01)
*G06K 9/00* (2006.01)
(52) U.S. Cl. ........................... 382/275; 382/131
(58) Field of Classification Search ................. 382/131, 382/275
See application file for complete search history.

(56) References Cited

U.S. PATENT DOCUMENTS

| | | | | |
|---|---|---|---|---|
| 6,067,366 A | * | 5/2000 | Simanovsky et al. | 382/100 |
| 6,687,393 B1 | * | 2/2004 | Skinner, Jr. | 382/131 |
| 2004/0101183 A1 | * | 5/2004 | Mullick et al. | 382/131 |

OTHER PUBLICATIONS

Ney et al., "Editing tools for 3D medical imaging", IEEE Computer Graphics and Applications, vol. 11, Issue 6, Nov. 1991, pp. 63-71.
Alyassin et al., "Semi-Automatic Bone Removal Technique from CT Angiography Data", Proc. SPIE, Medical Imaging 2001, vol. 4322, pp. 1273-1283.

* cited by examiner

*Primary Examiner*—Jingge Wu
*Assistant Examiner*—Eric J Mohr

(57) ABSTRACT

A method for detecting and removing small isolated fragments in a 3D segmented volume is disclosed. The 3D segmented volume is projected onto several 2D images from different viewing directions. Isolated 2D fragments are detected in the 2D images. Corresponding 3D fragments are found in the 3D volume by unprojecting corresponding detected 2D fragment locations. The unprojected detected 2D fragment locations are used as seed points for region growing of isolated 3D fragments. Any of the 3D fragments having a volume size below a user-defined threshold are discarded.

8 Claims, 3 Drawing Sheets

US 7,469,073 B2

IMAGE-BASED METHOD FOR DETECTION AND REMOVAL OF SMALL FRAGMENTS IN SEGMENTED THREE-DIMENSIONAL VOLUMES

CROSS REFERENCE TO RELATED APPLICATIONS

This application claims the benefit of U.S. Provisional Patent Application Ser. No. 60/573,961, filed May 24, 2004, which is incorporated by reference in its entirety.

FIELD OF THE INVENTION

The present invention relates to image-based segmentation, and more particularly to a method for automatically detecting and removing small isolated fragments in segmented three-dimensional volumes of large tomographic medical data.

BACKGROUND OF THE INVENTION

The side effect of generating small fragments representing noisy structures surrounding larger target objects within the desired range of interest is undesirable, but often unavoidable, when segmenting three-dimensional tomographic data. For example, when using a global threshold method to segment a target object in a grayscale volume, each voxel is classified into object and background determined by whether a voxel belongs to a selected group of intensity threshold values. When noise and other objects are present within overlapping threshold values in the gray volume, both the target object as well as other noise structures is included in the result.

In bone segmentation of clinical Computed Tomography Angiography (CTA) data, contrast enhanced vessels, vessel calcifications, and potentially other non-anatomical objects such as stents may overlap in intensity distribution as well as other segmentation properties with the bones. With the assumption that such noise structures are disconnected from the bones, and that they are generally smaller than the bones, known bone segmentation methods often perform removal of small isolated fragments as an optional or required step to improve accuracy. One of these known bone removal methods employs a method known in the art as Region Growing to isolate and compute the size of each fragment. Fragments below a specified size threshold are removed. A major drawback of this brute force approach is that both regions belonging to the large and small fragments are required to be traversed and their size computed. Therefore, it is very processing intensive, time consuming and impractical for large amounts of data.

Alternatively, it is possible to reduce the Region Growing operation to only remove regions connected to a user provided seed point. In order to determine where to place each seed point for each fragment to be removed, the 3D volume data is first projected onto a 2D image using a method known in the art as Volume Rendering, and subsequently, a user visually identifies the fragments in the 2D image and manually places 2D points over the fragments to be removed. The 2D points are then transformed to corresponding 3D coordinates. These coordinates are then used as seed points for 3D Region Growing to determine the boundaries of the identified segments and remove them from the volume data. Manual picking and removal of such fragments is only feasible if the number of fragments is not many, otherwise, this becomes a tedious and time consuming approach. Unfortunately, large tomographic medical data tend to have a large number of such undesired fragments and require longer processing time.

In particular, Computed Tomography (CT) data generated by modern multi-slice CT scanners are capable of generating studies with more than one thousand slices. CTA studies contain as many as two thousand slices. A large 3D volume of size 512×512×1000, where 512×512 is the slice resolution and 1000 is the number of slices, contains over 262 million volume elements (also known as voxels). It is therefore neither practical to remove noise fragments by brute force automatic methods, nor by picking each fragment manually. There is a need for a method for automatically removing small fragments in segmented 3D volumes that is accurate and efficient.

SUMMARY OF THE INVENTION

The present invention is directed to a method for detecting and removing small isolated fragments in a 3D segmented volume. The 3D segmented volume is projected onto several 2D images from different viewing directions. Isolated 2D fragments are detected in the 2D images. Corresponding 3D fragments are found in the 3D volume by unprojecting corresponding detected 2D fragment locations. The unprojected detected 2D fragment locations are used as seed points for region growing of isolated 3D fragments. Any of the 3D fragments having a volume size below a user-defined threshold are discarded.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a method for the removal of small isolated fragments in segmented three-dimensional volumes of tomographic medical data. In accordance with the present invention, the time-consuming manual picking of 2D point coordinates used for ray picking and 3D region growing is replaced by an image-based approach that detects 2D point coordinates corresponding to fragments in a 2D volume image that is rendered automatically. To improve the efficacy of this image-based method, several 2D volume rendered images from different viewing directions are generated and seed points are identified in each one of them. The efficacy of fragment detection is further improved by partitioning the volume into sub-sections, rendering each 3D sub-section to several 2D images from different viewing directions, and detecting 2D seed point coordinates for each sub-section. Alternatively, the viewing directions can be selected by the user manually. One application for the method of the present invention is to improve the accuracy of segmentation algorithms for bone segmentation in the presence of contrast-enhanced vessels, as well as to remove clutter around the surface of data segmented with thresholding operations.

Figure 1:
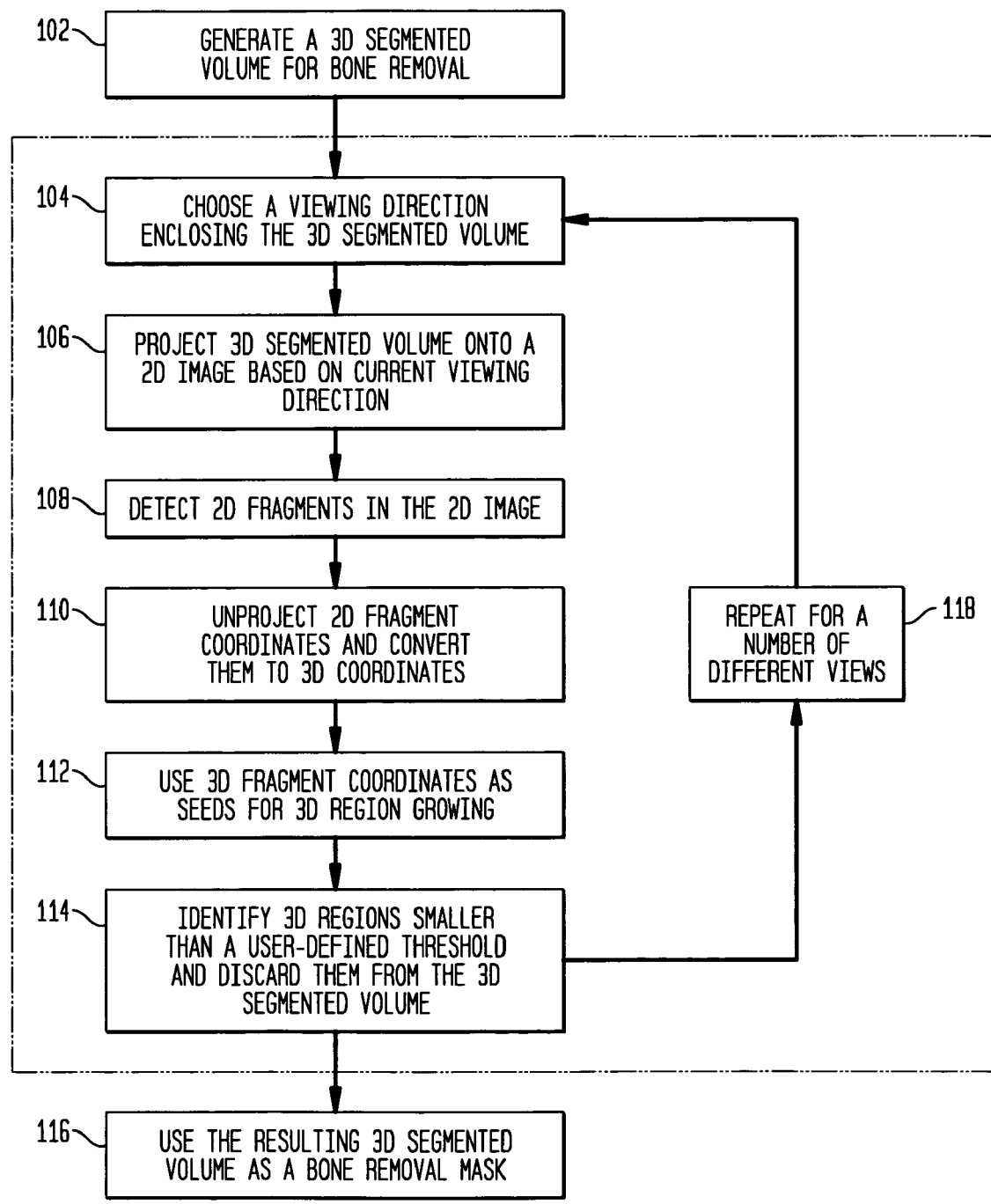
FIG. 1 shows a block diagram of the Image-Based Fragment Removal method as used in an automated workflow.

The overall steps in the proposed image-based fragment removal method, in the context of being used as an automated post processing step of a 3D bone segmentation method, are outlined in FIG. 1. The dashed line indicates the automated procedures. First, a 3D segmented volume is generated for bone removal (step 102). A number of viewing directions enclosing the 3D volume are chosen (step 104). The viewing directions are selected based on the optimal perceived view of potential fragments and likelihood that there will be minimal occlusions. The 3D segmented volume is projected onto several 2D images from the chosen different viewing angles.

The method is now described based on a selected viewing direction. As indicated above, the 3D segmented volume is projected onto a 2D image based on the selected viewing direction (step 106). From the rendered 2D image, a search is performed to locate 2D candidate seed points that may be part of a small fragment in the 3D volume (step 108). The results of this search is a set of 2D coordinates in the image space that can be transformed to the 3D segmented volume space to determine the 3D seed point coordinates (step 110). The 3D seed point coordinates are used in lieu of manually picked points to perform 3D Region Growing to determine the true fragment size (step 112). Fragments below a user defined size threshold are discarded from the 3D bone segmentation volume (step 114). Steps 104-114 are repeated for each chosen viewing direction. The resulting 3D segmented volume is used as a bone removal mask.

As described above, the 3D segmented volume is projected onto 2D images along various viewing direction via volume rendering methods. It is important to select viewing directions where occlusion of the fragments is minimal. When used in an automated fragment removal workflow, this selection is often based on a priori knowledge about the particular shape of the segmented object. When knowledge about the segmented volume is limited, one can optionally apply cropping to divide a large segmented volume into sub-regions during rendering such that parts of the segmented object is removed from the rendered image to better reveal the small fragments.

Figure 2:
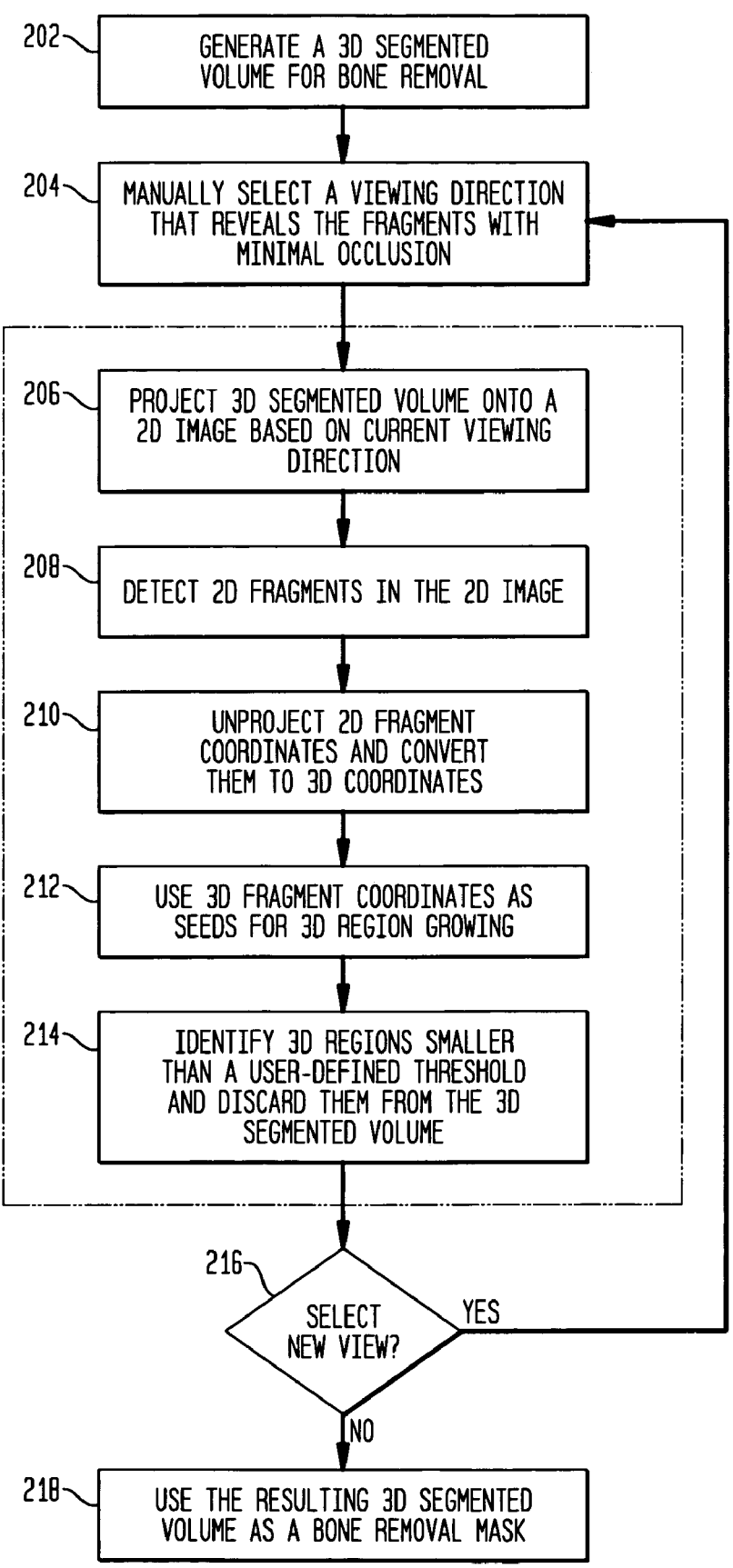
FIG. 2 shows a block diagram of the Image-Based Fragment Removal method as used in a semi-automated workflow where the viewing direction is selected by the user.

The selection of the viewing direction can also be done by the user in an interactive workflow as shown in FIG. 2. The dashed line indicates the automated procedures. As in the automated method, a 3D segmented volume for bone removal is generated (step 202). The view selection is coupled with a volume rendered image of the 3D segmented volume. In this way, the user can manually select the viewing direction that best reveal the fragments to be removed with the least amount of occlusion by typical volume rendering interactions such as pan and rotation (step 204). Steps 206-214 are the same as steps 104-114 in the automated method. Once fragment removal for the view has been completed, the user can select a new view (step 216). If a new view is selected, steps 206-214 are repeated for the new view. Otherwise, the resulting 3D segmented volume is used as a bone removal mask (step 218). This workflow require more manual interaction time by the user than the automated workflow described above; however, it has the advantage that it provides the user high visual feedback and perceptually intuitive results.

The Shaded Surface Display (SSD) volume rendering method is a simple and effective well known method for producing a grayscale 2D projected image of a 3D segmented volume that can be used for seed point location (step 106 and step 206). Lighting and material parameters supplied to this rendering method should be chosen such that the segmented objects and noise fragments are clearly distinguishable from the image background. To avoid bias in the seed point selection, the light source is chosen to be along the same direction as the viewing direction.

To select the set of 2D candidate seed points, region growing is performed for all pixels in the output grayscale image that are above a selected intensity threshold. The exclusion of low intensity threshold pixels prevents the selection of pixels along edges of a region object, which are not robust seed point candidates since they are highly subject to various interpolation and computation precision errors. All pixels connected to the initial pixel above a given intensity threshold are considered to be in the same 2D region. The size of the 2D region is checked for each region growing operation. If the size is below a selected maximum 2D fragment size, the first pixel that initiated the growing procedure is included in the set of candidate seed points. For further speed improvement, each pixel that belongs to a region that was determined to be too large can be tracked in a separate image buffer such that duplicate region growing operations are avoided.

The set of 2D candidate seed points are used in the same way as manually picked points to locate the 3D intersection coordinates. That is, each point is used as the origin of rays parallel to the viewing direction and casted towards the volume. The 3D intersection coordinate is determined through using a method known in the art as ray picking. Finally, the 3D intersection coordinates are used as seed points to perform the fragment removal step. Similar to the search method used for the small initial 2D candidate region search, each computed 3D seed point is used to perform 3D region growing to validate whether the 3D region is truly below the specified size threshold. This is necessary since an object that appears to be small in 2D along a given view direction may in fact be large due to occlusion along that view. During the 3D region growing, the size of the connected segmented region is updated. For computational efficiency, when a region exceeds the given size threshold, the region growing computation can be aborted, though the region can be marked in a working buffer to avoid duplicate traversal in the next region growing operations. Regions that are smaller than the given size threshold are then discarded from the segmented volume.

Compared to brute force fragment removal methods where all large and small fragment sizes are computed, the proposed automated image-based fragment removal method offers a faster automatic fragment removal method. The exact speed improvement depends on the number of fragments in the segmented volume and the data size. The selection of the 2D maximum fragment size used during 2D candidate seed point selection can also influence the processing speed of the image-based fragment removal method. Setting the 2D maximum fragment size too large may include too many seed points that belong to large 3D fragments that do not need to be removed and therefore increases the number of unnecessary 3D region growing operations. However, if the maximum 2D fragment size is set too low, 3D fragments that are in fact small in size may be excluded from the initial 2D seed point candidates and therefore will not be removed.

In a preliminary study, it has been found that choosing a 2D maximum size that removes most small fragments that are difficult to remove manually, while allowing a few slightly larger fragments, if any, offers a good tradeoff between automation and processing speed. It has been observed that with a segmented CTA volume of over 1000 slices, at a resolution of 512×512 per slice, the processing time of the brute force 3D fragment removal method based on 3D region growing can take up to minutes, while the image-based method only requires a few seconds on the same computer. Although, the image-based method may not remove all fragments in the volume below the specified size due to occlusion from the viewing directions chosen, it is typically fast and simple to remove any remaining few undesirable larger fragments using manual picking methods.

Figure 3:
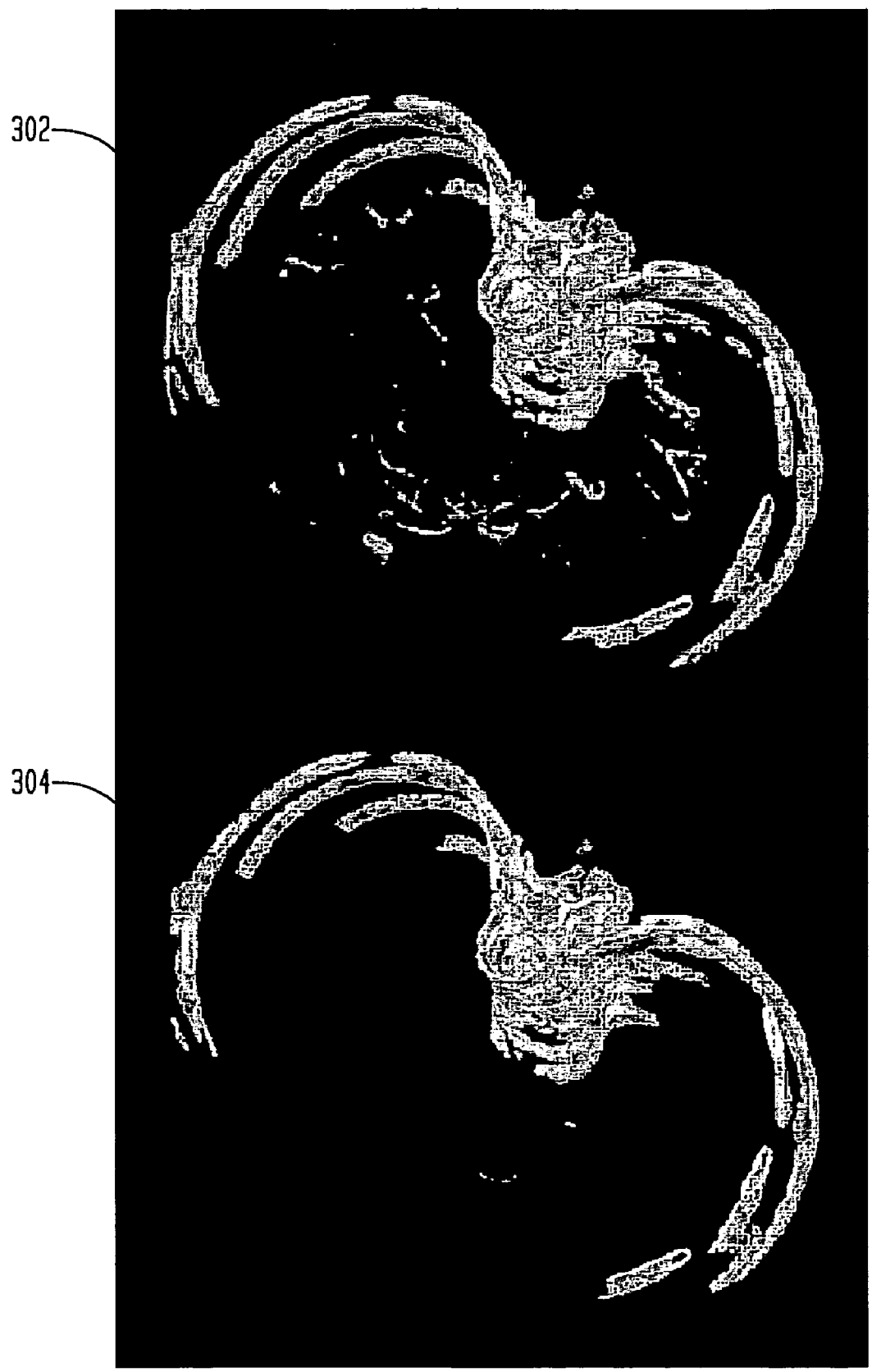
FIG. 3 illustrates the result of Image-Based Fragment Removal on a sample segmented CTA volume.

FIG. 3 illustrates a result of using the above described image-based fragment removal method on a sample segmented CTA volume. The objective in this case is to remove the small vessel fragments that were a result of over detection during the extraction of the bone mask. Image 302 is the bone mask prior to the application of the image-based fragment removal method. The resulting image 304 shows few if any fragments. Though a few larger vessel fragments remain after the automatic image-based fragment removal method, it is apparent that the image-based fragment removal method was effective in removing a majority of small vessel fragments and saving the user from many tedious mouse clicks.

Having described embodiments for a method for automatically detecting and removing small isolated fragments in segmented three-dimensional volumes of large tomographic medical data, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for detecting and removing small isolated fragments in a 3D segmented volume comprising the steps of:
    projecting the 3D segmented volume onto several 2D images from different viewing directions;
    detecting isolated 2D fragments in the 2D images;
    finding corresponding 3D fragments in the 3D volume by unprojecting corresponding detected 2D fragment locations;
    using the unprojected detected 2D fragment locations as seed points for region growing of isolated 3D fragments; and
    discarding any of the 3D fragments having a volume size below a user-defined threshold.

2. The method of claim 1 wherein the step of projecting the 3D segmented volume onto several 2D images further comprises the steps of:
    partitioning the segmented 3D volume into sub-sections; and
    rendering each 3D subsection to several 2D images from different viewing directions.

3. The method of claim 1 wherein the viewing direction is determined automatically.

4. The method of claim 1 wherein the viewing direction is manually selected.

5. The method of claim 1 wherein a shaded surface display volume rendering method is used to detect isolated 2D fragments in the 2D images.

6. The method of claim 1 wherein a light source is used for detection of isolated 2D fragments and the light source is directed in a same direction as the viewing direction of the 3D volume.

7. The method of claim 1 wherein the step of finding the corresponding 3D fragment uses ray picking to determine a 3D intersection coordinate.

8. The method of claim 1 wherein the 3D volume comprises tomographic medical data.

\* \* \* \* \*